Jan. 25, 1927.
M. E. BUHSE
1,615,680
ICE CREAM CONE
Filed Jan. 25, 1922
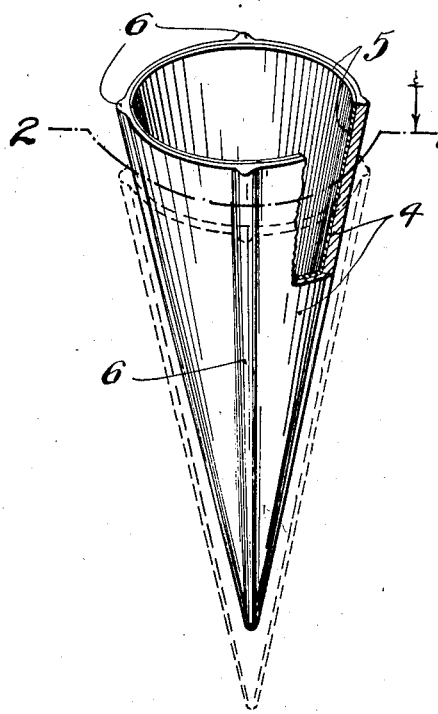
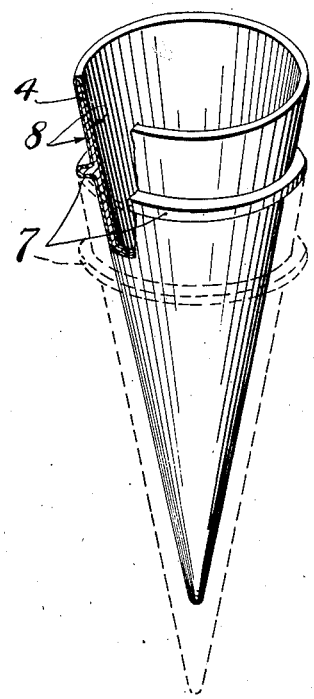
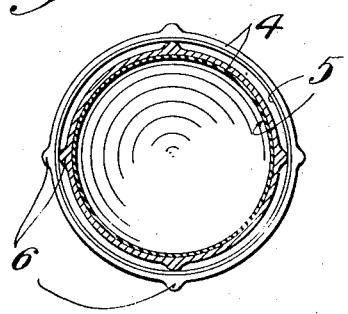
Inventor
Maximilian E. Buhse
By his Attorneys Patented Jan. 25, 1927.

1,615,680

UNITED STATES PATENT OFFICE.

MAXIMILIAN E. BUHSE, OF MINNEAPOLIS, MINNESOTA, ASSIGNOR TO MARYLAND BAKING CO., OF BALTIMORE, MARYLAND.

ICE-CREAM CONE.

Application filed January 25, 1922. Serial No. 531,590.

My invention relates to the type of ice-cream receptacles that are made of baked pastry and adapted to be eaten with the ice-cream therein contained, and are generally designated as ice-cream cones; and the invention provides, as a new article of manufacture, a highly improved article of the above character.

In accordance with my invention, the pastry cone is provided with a heavy internal coating of chocolate that will harden and remain hard under all ordinary temperatures and, of course, under very low temperatures. This coating may be sprayed on or otherwise applied and will be of such thickness that it not only reinforces the pastry cone but will be a very pronounced element in the flavor of the ice-cream cone. Also, this coating will make the cone impervious to water and will adapt the same to hold any melted ice-cream, even when, as sometimes will happen, the outer, relatively brittle, pastry shell of the cone is cracked. This coating, as is obvious, will also prevent the pastry cone from becoming soaked or soggy and will prevent the melted cream from leaking through the cone.

In the accompanying drawings, which illustrate the invention, like characters indicate like parts throughout the several views.

Referring to the drawings:

Fig. 1 is a perspective with some parts broken away, showing one complete cone in full lines and indicated by dotted lines a second cone into which the first cone is nested;

Fig. 2 is a horizontal section on the line 2—2 of Fig. 1, but showing both cones by full lines; and Fig. 3 is a view corresponding to Fig. 1, but illustrating a slightly modified construction.

Referring first to the construction illustrated in Figs. 1 and 2, the numeral 4 indicates the baked pastry body or outer shell of the cone and the numeral 5 indicates the heavy candied or hard chocolate inner coating thereof. As shown, the pastry shell 4 is provided with longitudinal external ribs 6 that limit the points of contact between the nested cones and prevent the chocolate interior coating of the one cone from having extended contact with the exterior of the cone inserted into the same for the purpose of close packing in shipment.

The cone shown in Fig. 3, instead of having longitudinal exterior ribs 6, is provided with a circumferential contact rib 7. Also, this cone shown in Fig. 3 is provided with a chocolate coating 8 that extends not only over the interior but also over the exterior surface thereof. However, it is deemed by far the best practice to leave the cones with exposed baked pastry external surfaces, as these are best adapted to be held in the hand.

From the above, it will be understood that the chocolate coating performs several important functions, to wit: it produces a reinforcement of the cone, it provides the cone with a glazed protective surface and materially changes the flavor of the ice-cream cone. When the chocolate coating is unsweetened, that is, a bitter chocolate, the cone will have a flavor character known as "bittersweet", and as the chocolate coating is heavy and hard, as compared with the cone and ice-cream, it produces a very pleasing effect in that its presence will be distinctly noted. The heavy chocolate coating will so much reinforce the cone that it is feasible to make the pastry body of the cone of a very brittle character, which seems to be necessary to the best flavored cones, but which has hitherto seldom been used because of their fragile nature.

All of the above noted features combine to produce an ice-cream cone of much finer character than hitherto produced and which is, in fact, a high-grade and palatable confection.

What I claim is:

1. An ice cream cone having on the outer surface of the cone a plurality of narrow vertical ribs equi-spaced and at least 45° apart, said ribs being adapted to engage the smooth inside surface of nested cones to support each cone from the cone above it and to minimize the area of contact.

2. A conical ice cream cone having on its outer surface a plurality of narrow ribs, each rib extending more than half the distance from the top to the apex of the cone, said ribs preventing too snug nesting of telescoped cones.

In testimony whereof I affix my signature.

MAXIMILIAN E. BUHSE.